(12) United States Patent
Jeon et al.

(10) Patent No.: US 12,431,481 B2
(45) Date of Patent: Sep. 30, 2025

(54) METHOD FOR PRE-LITHIATION OF NEGATIVE ELECTRODE, PRE-LITHIATED NEGATIVE ELECTRODE AND LITHIUM SECONDARY BATTERY INCLUDING THE SAME

(71) Applicant: LG ENERGY SOLUTION, LTD., Seoul (KR)

(72) Inventors: Seo-Young Jeon, Daejeon (KR); Ye-Ri Kim, Daejeon (KR); Su-Yeon Lee, Daejeon (KR); Oh-Byong Chae, Daejeon (KR); Seung-Hae Hwang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 545 days.

(21) Appl. No.: 17/800,025

(22) PCT Filed: Feb. 17, 2021

(86) PCT No.: PCT/KR2021/002041
§ 371 (c)(1),
(2) Date: Aug. 16, 2022

(87) PCT Pub. No.: WO2021/167353
PCT Pub. Date: Aug. 26, 2021

(65) Prior Publication Data
US 2023/0073365 A1    Mar. 9, 2023

(30) Foreign Application Priority Data
Feb. 17, 2020  (KR) .................. 10-2020-0019310

(51) Int. Cl.
*H01M 4/04* (2006.01)
*H01M 10/0525* (2010.01)
*H01M 4/02* (2006.01)

(52) U.S. Cl.
CPC ....... *H01M 4/0459* (2013.01); *H01M 4/0445* (2013.01); *H01M 10/0525* (2013.01); *H01M 2004/027* (2013.01)

(58) Field of Classification Search
CPC ....... H01M 10/0525; H01M 2004/027; H01M 4/0445; H01M 4/0459; H01M 4/13;
(Continued)

(56) References Cited

U.S. PATENT DOCUMENTS

| 6,558,438 B1 | 5/2003 | Satoli et al. |
| 2016/0126543 A1* | 5/2016 | Ota ........................ H01M 4/587 |

(Continued)

FOREIGN PATENT DOCUMENTS

| CN | 201191630 Y | 2/2009 |
| EP | 1 071 151 A1 | 1/2001 |

(Continued)

OTHER PUBLICATIONS

Extended European Search Report for European Application No. 21757427.6, dated Aug. 10, 2023.
(Continued)

*Primary Examiner* — Victoria H Lynch
(74) *Attorney, Agent, or Firm* — Birch, Stewart, Kolasch & Birch, LLP (57) ABSTRACT

A method for pre-lithiation of a negative electrode including the steps of: interposing a separator between a lithium ion-supplying metal sheet and a negative electrode to prepare a simple cell; dipping the simple cell in an electrolyte for pre-lithiation; and disposing the simple cell dipped in the electrolyte for pre-lithiation between two polymer pads, and carrying out electrochemical charging, while pressurizing the outside of the two polymer pads, to perform pre-lithiation of the negative electrode. Each of the polymer pads has a thickness of 60% to 90% of a thickness of a corre-
(Continued)

sponding jig of the pair of jigs. A pre-lithiated negative electrode and a lithium secondary battery including the pre-lithiated negative electrode are also disclosed.

11 Claims, 3 Drawing Sheets

(58) Field of Classification Search
CPC .... H01M 4/133; H01M 4/139; H01M 4/1393; Y02E 60/10
See application file for complete search history.

(56) References Cited

U.S. PATENT DOCUMENTS

| | | |
|---|---|---|
| 2017/0084914 A1 | 3/2017 | Haag |
| 2019/0248230 A1 | 8/2019 | Lee et al. |
| 2020/0058829 A1 | 2/2020 | Chae et al. |
| 2021/0135274 A1 | 5/2021 | Chae et al. |

FOREIGN PATENT DOCUMENTS

| | | | |
|---|---|---|---|
| EP | 2228338 A1 * | 9/2010 | ............. C01B 3/065 |
| JP | 2001-297798 A | 10/2001 | |
| KR | 10-1999-0086308 A | 12/1999 | |
| KR | 10-2015-0089966 A | 8/2015 | |
| KR | 10-2015-0014977 A | 2/2018 | |
| KR | 10-2018-0036625 A | 4/2018 | |
| KR | 10-2018-0112659 A | 10/2018 | |
| KR | 10-2019-0017149 A | 2/2019 | |
| KR | 10-2019-0071301 A | 6/2019 | |

OTHER PUBLICATIONS

International Search Report (PCT/ISA/210) issued in PCT/KR2021/002041, dated Jun. 2, 2021.

* cited by examiner

METHOD FOR PRE-LITHIATION OF NEGATIVE ELECTRODE, PRE-LITHIATED NEGATIVE ELECTRODE AND LITHIUM SECONDARY BATTERY INCLUDING THE SAME

TECHNICAL FIELD

The present disclosure relates to a method for pre-lithiation of a negative electrode, a pre-lithiated negative electrode and a lithium secondary battery including the same.

The present application claims priority to Korean Patent Application No. 10-2020-0019310 filed on Feb. 17, 2020 in the Republic of Korea, the disclosures of which are incorporated herein by reference.

BACKGROUND ART

Recently, energy storage technology has been given an increasing attention. Efforts into research and development of electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage, a significantly higher energy density, a longer cycle life and a lower self-discharge rate, as compared to conventional batteries, such as Ni-MH, Ni—Cd and sulfuric acid-lead batteries using an aqueous electrolyte.

Since the conventional lithium secondary batteries use a lithium-intercalated compound, such as $LiCoO_2$ or $LiMn_2O_4$, as a positive electrode, such batteries have been manufactured by using a carbon electrode, to which lithium is not intercalated, as a negative electrode. In the case of a carbon electrode, a passivated coating film is formed on the surface thereof upon the initial charge, and the coating film interrupts insertion of an organic solvent into a gap between carbon lattice layers and inhibits decomposition of the organic solvent. In this manner, stabilization of a carbon structure and reversibility of a carbon electrode can be improved to allow use of the carbon electrode as a negative electrode for a lithium secondary battery.

However, since the formation of such a coating film is an irreversible reaction, lithium ions are consumed, resulting in a decrease in battery capacity undesirably. In addition, since the charge/discharge efficiency of the carbon electrode and positive electrode is not completely 100%, lithium ion consumption occurs, as the cycle number is increased, resulting in the problems of a decrease in electrode capacity and a degradation of cycle life.

Many studies have been conducted to solve the above-mentioned problems, and it has been found that use of a pre-lithiated carbon electrode as a negative electrode can provide a high-capacity lithium secondary battery with no decrease in capacity, since the coating film formation occurring upon the initial charge is performed in advance. It has been also found that cycle life can be improved significantly, since such a pre-lithiated carbon electrode compensates for lithium ions consumed as the cycle number is increased.

Then, active studies have been conducted about pre-lithiation of a negative electrode, such as a carbon electrode. Typically, a method for lithiating a carbonaceous active material through a physicochemical process and manufacturing an electrode, and a method for electrochemically pre-lithiating a carbon electrode have been considered.

However, in the case of the method for pre-lithiation based on an electrochemical charge process through the pressurization with a jig, lithium ions cannot be intercalated homogeneously to a negative electrode, resulting in the problems of an increase in resistance and a degradation of cycle charge/discharge performance.

DISCLOSURE

Technical Problem

The present disclosure is designed to solve the problems of the related art, and therefore the present disclosure is directed to providing a method for pre-lithiation of a negative electrode which allows sufficiently homogeneous intercalation of lithium ions and formation of a uniform SEI layer, a pre-lithiated negative electrode, and a lithium secondary battery including the same.

Technical Solution

In one aspect of the present disclosure, there is provided a method for pre-lithiation of a negative electrode according to any one of the following embodiments.

According to the first embodiment of the present disclosure, there is provided a method for pre-lithiation of a negative electrode including the steps of:
  interposing a separator between a lithium ion-supplying metal sheet and a negative electrode to prepare a simple cell;
  immersing the simple cell in an electrolyte for pre-lithiation; and
  disposing the simple cell immersed in the electrolyte for pre-lithiation between two polymer pads, and carrying out electrochemical charging, while pressurizing the outside of the two polymer pads, to perform pre-lithiation of the negative electrode,
  wherein the polymer pads have a thickness of 60-90% of the thickness of the jig of the pressurizing member.

According to the second embodiment of the present disclosure, there is provided the method for pre-lithiation of a negative electrode as defined in the first embodiment, wherein each of the polymer pads has a thickness of 70% to 85% of the thickness of a corresponding jig of the pair of jigs.

According to the third embodiment of the present disclosure, there is provided the method for pre-lithiation of a negative electrode as defined in the first or the second embodiment, wherein the pressurizing member includes a jig press or a jig formation device.

According to the fourth embodiment of the present disclosure, there is provided the method for pre-lithiation of a negative electrode as defined in any one of the first to the third embodiments, wherein one surface of each of the polymer pads facing the simple cell has an area larger than the area of the lithium ion-supplying metal sheet, and an entirety of four edges of the lithium ion-supplying metal sheet are in contact with the surfaces of the polymer pads.

According to the fifth embodiment of the present disclosure, there is provided the method for pre-lithiation of a negative electrode as defined in any one of the first to the fourth embodiments, wherein each of the polymer pads includes a polymer having a glass transition temperature of −100° C. or lower.

According to the sixth embodiment of the present disclosure, there is provided the method for pre-lithiation of a negative electrode as defined in any one of the first to the fifth embodiments, wherein the polymer includes silicone (polysiloxane), polybutadiene, low-density polyethylene, or two or more of them.

According to the seventh embodiment of the present disclosure, there is provided the method for pre-lithiation of a negative electrode as defined in any one of the first to the sixth embodiments, wherein the electrolyte for pre-lithiation includes a lithium salt and a non-aqueous solvent.

According to the eighth embodiment of the present disclosure, there is provided the method for pre-lithiation of a negative electrode as defined in the seventh embodiments, wherein the lithium salt includes LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lithium lower aliphatic carboxylate, lithium 4-phenylborate, or two or more of them.

According to the ninth embodiment of the present disclosure, there is provided the method for pre-lithiation of a negative electrode as defined in any one of the first to the eighth embodiments, wherein the electrochemical charging is carried out to 1-50% of the charge capacity of the negative electrode (based on Li-ion charge capacity).

In another aspect of the present disclosure, there is provided a negative electrode according to the following embodiment.

According to the tenth embodiment of the present disclosure, there is provided a pre-lithiated negative electrode obtained by the method as defined in any one of the first to the ninth embodiments.

In still another aspect of the present disclosure, there is provided a lithium secondary battery according to the following embodiment.

According to the eleventh embodiment of the present disclosure, there is provided a lithium secondary battery including the pre-lithiated negative electrode as defined in the tenth embodiment.

Advantageous Effects

The method for pre-lithiation of a negative electrode according to an embodiment of the present disclosure performs pre-lithiation through electrochemical charging, while polymer pads are disposed and pressurized between the jigs of a pressurizing member during the pre-lithiation, unlike the conventional method for pre-lithiation of a negative electrode using electrochemical charge through pressurization with jigs. Therefore, lithium ions are intercalated sufficiently homogeneously to a negative electrode and a uniform solid electrolyte interface (SEI) layer is formed, and thus it is possible to prevent generation of additional byproducts of a lithium source and to realize higher initial coulombic efficiency, while facilitating lithium ion intercalation during charge/discharge. It is also possible to improve the cycle performance of a lithium secondary battery using the pre-lithiated negative electrode.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

In one aspect of the present disclosure, there is provided a method for pre-lithiation of a negative electrode including the steps of:
  interposing a separator between a lithium ion-supplying metal sheet and a negative electrode to prepare a simple cell;
  immersing the simple cell in an electrolyte for pre-lithiation; and
  disposing the simple cell immersed in the electrolyte for pre-lithiation between two polymer pads, and carrying out electrochemical charging, while pressurizing the outside of the two polymer pads, to perform pre-lithiation of the negative electrode,
  wherein the polymer pads have a thickness of 60-90% of the thickness of the jig of the pressurizing member.

Hereinafter, each step will be explained in more detail.

First, a separator is interposed between a lithium ion-supplying metal sheet and a negative electrode to prepare a simple cell.

The lithium ion-supplying metal sheet functions as a source for supplying lithium ions doped to the negative electrode, and may include a lithium ion-containing material selected from lithium, lithium alloys and mixtures thereof. The lithium alloys may include Li—Al, Li—Cu, Li—Si, or the like, but are not limited thereto.

The lithium ion-supplying metal sheet may include a metal selected from lithium, lithium alloys and mixtures thereof, alone, or may further include a substrate attached to one surface of the metal for supporting the metal. The substrate may include stainless steel (SUS), aluminum, nickel, titanium, baked carbon, copper, or the like.

The lithium ion-supplying metal sheet may have a thickness of 15-300 μm, or 20-100 μm.

The separator is disposed on one surface of the metal opposite to the negative electrode. The separator may function to prevent the metal sheet and the negative electrode from being in direct contact with each other. This is because direct contact between the metal sheet and the negative electrode may cause a doping process (lithiation), thereby making it difficult to control the doping process and interrupting a homogeneous doping process on the negative electrode. In other words, the separator may function to stabilize the doping process of the negative electrode. Herein, the separator may be any separator used for a conventional secondary battery with no particular limitation.

According to an embodiment of the present disclosure, the negative electrode may include, as a negative electrode active material, a carbonaceous material, silicon-based material (e.g. silicon oxide of $SiO_x$ (0<x<2)), Si, or the like.

The carbonaceous material may be at least one selected from the group consisting of crystalline artificial graphite, crystalline natural graphite, amorphous hard carbon, low-crystalline soft carbon, carbon black, acetylene black, Ketjen black, Super P, graphene, and fibrous carbon, and preferably may be crystalline artificial graphite and/or crystalline natural graphite.

Besides the above-mentioned materials, particular examples of the negative electrode active material include a metal composite oxide, such as $Li_xFe_2O_3$ (0≤x≤1), $Li_xWO_2$ (0≤x≤1), $Sn_xMe_{1-x}Me'_yO_z$ (Me: Mn, Fe, Pb, Ge; Me': Al, B, P, Si, an element of Group 1, Group 2 or Group 3 in the Periodic Table, or halogen; 0≤x≤1; 1≤y≤3; 1≤z≤8), or the like; lithium metal; lithium alloy; silicon-based alloy; tin-based alloy; metal oxide, such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO2$, $Bi_2O_3$, $Bi_2O_4$, $Bi_2O_5$, or the like; a conductive polymer, such as polyacetylene; a Li—Co—Ni type material; titanium oxide; lithium titanium oxide, or the like. Particularly, the negative electrode active material may include a carbonaceous material and/or Si.

In general, the negative electrode is obtained by applying negative electrode slurry prepared by dispersing a negative electrode active material, a conductive material and a binder in a dispersion medium onto a negative electrode current collector, and carrying out drying. If necessary, the electrode slurry may further include a filler.

The negative electrode current collector generally has a thickness of 3-500 μm. The negative electrode current collector is not particularly limited, as long as it has conductivity, while not causing any chemical change in the corresponding battery. Particular examples of the negative electrode current collector include copper, stainless steel, aluminum, nickel, titanium, baked carbon, copper or stainless steel surface-treated with carbon, nickel, titanium, silver, etc., aluminum-cadmium alloy, or the like. In addition, similarly to the positive electrode current collector, fine surface irregularities may be formed on the surface of the negative electrode current collector to reinforce the binding force to the negative electrode active material. The negative electrode current collector may be used in various shapes, including a film, sheet, foil, net, porous body, foamed body, non-woven web, or the like.

The conductive material is added generally in an amount of 1-50 wt % based on the total weight of the mixture including the negative electrode active material. Such a conductive material is not particularly limited, as long as it has conductivity, while not causing any chemical change in the corresponding battery. Particular examples of the conductive material include: graphite, such as natural graphite or artificial graphite; carbon black, such as carbon black, Denka black, acetylene black, Ketjen black, channel black, furnace black, lamp black or thermal black; conductive fibers, such as carbon fibers or metallic fibers; metal powder, such as fluorocarbon, aluminum or nickel powder; conductive whiskers, such as zinc oxide or potassium titanate; conductive metal oxides, such as titanium oxide; conductive materials, such as a polyphenylene derivative; or the like.

Meanwhile, a graphitic material having elasticity may be used as a conductive material, optionally in combination with the above-mentioned materials.

The binder is an ingredient which assists binding of the active material with the conductive material and binding to the current collector, and is added generally in an amount of 1-50 wt %, based on the total weight of the mixture including the negative electrode active material. Particular examples of the binder include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluororubber, various copolymers, or the like.

The dispersion medium may include water, alcohols, such as ethanol, acetone, or the like.

The filler is an ingredient which inhibits swelling of the negative electrode and is used optionally. Such a filler is not particularly limited, as long as it is a fibrous material, while not causing any chemical change in the corresponding battery. Particular examples of the filler include: olefinic polymers, such as polyethylene or polypropylene; and fibrous materials, such as glass fibers or carbon fibers.

The negative electrode is allowed to face the lithium ion-supplying metal sheet with the separator interposed therebetween, thereby preparing a simple cell. Herein, the negative electrode may be prepared by cutting the negative electrode in such a manner that it may be provided with a non-coated tab portion and a negative electrode material-retaining portion.

According to an embodiment of the present disclosure, the method for pre-lithiation of a negative electrode is carried out in an electrolyte for pre-lithiation. To carry out pre-lithiation, the separator is interposed between the lithium ion-supplying metal sheet and the negative electrode to prepare a simple cell. In a variant, two or more lithium ion-supplying metal sheets and negative electrodes are used with the separator interposed between each lithium ion-supplying metal sheet and each negative electrode, and then stacked successively to prepare a simple cell.

Next, the simple cell is immersed in the electrolyte for pre-lithiation.

The electrolyte for pre-lithiation may include a lithium salt and a non-aqueous solvent.

The lithium salt may include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lithium lower aliphatic carboxylate, lithium 4-phenylborate, or two or more of them.

The non-aqueous solvent may be any organic solvent used conventionally in the art with no particular limitation. Preferably, a high-boiling point organic solvent may be used so as to minimize consumption of the electrolyte for pre-lithiation, caused by evaporation during the pre-lithiation.

The non-aqueous solvent may include a carbonate solvent, a ester solvent, or two or more of them. Particular examples of the non-aqueous solvent include, but are not limited to: propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone, ethyl propionate, and methyl propionate, but are not limited thereto, and such solvents may be used alone or in combination.

The electrolyte for pre-lithiation may further include an additive.

The additive may include vinylene carbonate, vinyl ethylene carbonate, fluoroethylene carbonate, salicylic acid, $LiBF_4$, lithium bis(trifluoromethanesulfonyl)imide (LITFSI), lithium bis(oxalate)borate (LiBOB), lithium difluoro(oxalate)borate (LiODFB), or two or more of them.

According to an embodiment of the present disclosure, the simple cell may be immersed in the electrolyte for pre-lithiation for 1-30 hours so that the negative electrode may be wetted with the electrolyte for pre-lithiation. When the immersing time satisfies the above-defined range, the negative electrode active material may be wetted sufficiently with the electrolyte for pre-lithiation, thereby facilitating the subsequent process, pre-lithiation. In addition, it is possible to prevent the problem caused by an excessively long immersing time, the problem including degradation of the durability of the electrode and easy detachment of the active material from the current collector during processing. When the electrolyte for pre-lithiation infiltrates homogeneously into the negative electrode through the wetting, lithium ions isolated from the lithium ion-supplying metal sheet may be diffused homogeneously to the negative electrode, and thus pre-lithiation may be carried out with a homogeneous lithium ion concentration over the whole negative electrode.

To facilitate immersing/wetting of the simple cell in/with the electrolyte for pre-lithiation, the reactor for carrying out wetting may be converted into a vacuum state of less than 760 mmHg. Herein, the electrolyte for pre-lithiation with which the simple cell is wetted may have a temperature of 30-60° C.

Next, the simple cell immersed in the electrolyte for pre-lithiation is disposed between two polymer pads, and subjected to electrochemical charging, while pressurizing the outside of the two polymer pads by using a pressurizing member, to perform pre-lithiation of the negative electrode.

According to an embodiment of the present disclosure, after the simple cell is immersed in the electrolyte for pre-lithiation and even the inner part of the simple cell is wetted sufficiently with the electrolyte for pre-lithiation, the simple cell immersed in the electrolyte for pre-lithiation is disposed between two polymer pads, and then subjected to electrochemical charging by using a charger, while pressurizing the outside of the two polymer pads by using a pressurizing member.

Herein, the extent of electric current during the charging may be 0.1-10 $mA/cm^2$, 0.5-3 $mA/cm^2$, 0.5-2 $mA/cm^2$, 0.5-1 $mA/cm^2$, 1-10 $mA/cm^2$, or 1-3 $mA/cm^2$. When the extent of electric current during the charging satisfies the above-defined range, there is an advantage in that lithium ions may react stably and homogeneously with the negative electrode.

According to an embodiment of the present disclosure, the electrochemical charging may be carried out to 1-50%, 5-30%, 5-25%, or 7-20% of the charge capacity of the negative electrode (based on Li-ion charge capacity). When the electrochemical charging is carried out within the above-defined range, it is possible to improve the initial efficiency and cycle characteristics of a battery. It is also possible to prevent the problem of degradation of stability caused by excessive electrodeposition of lithium. Herein, the charge capacity of the negative electrode may be determined from the theoretical capacity of the negative electrode active material loaded on the negative electrode, and the electrochemical charging may be carried out in such a manner that the charger may stop charging, after the simple cell is charged to a predetermined percentage (%) of capacity calculated within the above-defined range.

After disposing the simple cell immersed in the electrolyte between two polymer pads, the electrochemical charging is carried out, while pressurizing the outside of the two polymer pads.

The method for pressurizing the simple cell is not particularly limited, and any method known to those skilled in the art may be used. For example, the method for pressurizing the simple cell may be carried out by using a pressurizing member, such as a jig press or a jig formation device. Particularly, the pressurizing member may be provided with a pair of planar jigs, and the simple cell may be pressurized by changing the interval between the planar jigs.

The pressurizing member may be made of a material having no reactivity with an organic electrolyte, and particular examples of the material include polyetheretherketone (PEEK), stainless steel, or the like.

The simple cell is disposed between two polymer pads, and a predetermined pressure is applied to the outside of the two polymer pads by a pair of jigs. In this manner, electrochemical charging may be carried out under pressurization, while the lithium ion-supplying sheet faces the negative electrode active material layer of the negative electrode with the separator interposed therebetween.

When a negative electrode is pre-lithiated through electrochemical charging by allowing the negative electrode is in direct contact with a pressurizing member, such as a jig press, according to the related art, lithium ions may not be intercalated homogeneously to the negative electrode, resulting in an increase in resistance and a degradation of cycle charge/discharge performance.

However, according to an embodiment of the present disclosure, the polymer pad is inserted between the negative electrode of the simple cell and the jig of a pressurizing member, and then pre-lithiation is carried out through electrochemical charging under pressurization. In this manner, a difference in pressurization causes no gap between the lithium metal/SUS plate and the electrode and does not generate a difference in resistance, and thus polarization is performed uniformly to allow uniform lithium ion intercalation to the negative electrode and formation of a uniform solid electrolyte interface (SEI) layer. As a result, in the lithium secondary battery using the negative electrode having such a uniform solid electrolyte interface (SEI) layer, the lithium ion source is not consumed in the form of byproducts on the electrode surface but is used only for the intercalation to the active material layer, thereby providing improved cycle charge/discharge performance.

The polymer pad has a thickness of 60-90% of the thickness of the jig of the pressurizing member. According to an embodiment of the present disclosure, the polymer pad may have a thickness of 70-85%, or 75-85% of the thickness of the jig of the jig press.

Herein, the thickness of the polymer pad refers to the thickness of one polymer pad of the two polymer pads used in the pre-lithiation step, and the thickness of the jig of the pressurizing member means the thickness of the jig at the side facing the polymer pad.

When the thickness of the polymer pad is less than 60% of the thickness of the jig of the pressurizing member, pressure may not be transferred constantly to the assembled cell, and a larger extent of pressure may be applied to the edge portion of the pressurizing member. When the thickness of the polymer pad is larger than 90% of the thickness of the jig of the pressurizing member, a desired extent of pressure may not be transferred accurately to the simple cell.

The above-defined thickness of the polymer pad and that of the jig of the pressurizing member allow a desired extent of pressure to be applied constantly into the simple cell so that the interval between the lithium ion-suppling metal sheet and the negative electrode may be retained constantly and the same polarization may be applied. Therefore, SEI layers are formed uniformly on the stacked pre-lithiated negative electrodes to provide improved initial coulombic efficiency and to assist capacity retention during charge/discharge cycles. As a result, it is important to control the thickness of the polymer pad to 60-90% of the thickness of the jig of the pressurizing member.

The polymer pad may include any polymer with no particular limitation, as long as it has impact resistance, flexibility, processability, chemical resistance and electrical insulation property. According to an embodiment of the present disclosure, the polymer pad may include an amorphous polymer, particularly a polymer having a glass transition temperature of −100° C. or less, or may consist of such a polymer.

Non-limiting examples of the polymer include silicone (polysiloxane), polybutadiene, low-density polyethylene, or two or more of them.

The lithium ion-supplying metal sheet may be pressurized by the pressurizing member under a pressure of 0.01-10 kPa, 0.05-5 kPa, 0.1-3 kPa, 0.5-2 kPa, 1-3 kPa, or 2-3 kPa against the negative electrode active material layer. When the pressure applied during the pressurization satisfies the above-defined range, pre-lithiation is facilitated, and the problem of physical damage upon the negative electrode may be prevented.

According to an embodiment of the present disclosure, the area of one surface of the polymer pad facing the outside of the simple cell is larger than the area of the metal sheet disposed at the outside of the simple cell, and four edges of the metal sheet may be totally in contact with one surface of the polymer pad.

When the area of one surface of the polymer pad facing the outside of the simple cell is larger than the area of the metal sheet disposed at the outside of the simple cell, and four edges of the metal sheet may be totally in contact with one surface of the polymer pad, as mentioned above, the pressure of the pressurizing member can be applied constantly to 'the negative electrode disposed between the lithium ion-supplying metal sheet and the separator'.

According to an embodiment of the present disclosure, the simple cell may be a mono-layer type cell including one negative electrode between one lithium ion-supplying metal sheet and one separator. In a variant, the simple cell may be a multi-layer type cell having a plurality of negative electrodes, since a plurality of separators may be interposed between a plurality of lithium ion-supplying metal sheets and negative electrodes.

Therefore, both when the simple cell includes one negative electrode and when the simple cell includes a plurality of negative electrodes, the same polarization is applied to the negative electrodes in the simple cell so that the negative electrodes may be pre-lithiated at the same voltage range. As a result, uniform SEI layers are formed, which is advantageous in terms of initial coulombic efficiency and capacity retention during charge/discharge cycles.

Then, according to an embodiment of the present disclosure, the negative electrode may be taken out of the electrolyte for pre-lithiation, washed with an organic solvent, and then dried. The organic solvent used for washing may include dimethyl carbonate, diethyl carbonate, ethyl methyl carbonate, or the like. In this manner, it is possible to dissolve lithium salt sufficiently and to wash the negative electrode, while causing no damage upon the negative electrode.

The drying may be carried out by the method generally known to those skilled in the art. For example, the negative electrode may be dried in a dry room at 20-40° C. for 10 minutes to 5 hours.

In another aspect of the present disclosure, there is provided a pre-lithiated negative electrode obtained by the above-described method for pre-lithiation.

In addition, the pre-lithiated negative electrode according to an embodiment of the present disclosure includes: a current collector; a negative electrode active material layer disposed on at least one surface of the current collector and including a negative electrode active material; and a coating layer including Li-carbonate and Li, formed on the surface of the negative electrode active material layer.

The negative electrode is provided with a coating layer including Li-carbonate and Li, formed on the surface of the negative electrode active material layer. The coating layer corresponds to a passivated film formed by the above-described pre-lithiation.

During the pre-lithiation of the negative electrode, the electrolyte for pre-lithiation is in contact with the negative electrode active material to cause oxidative-reductive decomposition of the ingredients of electrolyte at the interface, and the decomposition products may be deposited or adsorbed on the interface to form a coating layer as a new interfacial layer.

The coating layer may include Li, reduced and deposited after lithium ions migrate toward the negative electrode during the pre-lithiation, and Li-carbonate ($Li_2CO_3$) produced by the reductive decomposition reaction between lithium ions and a carbonate compound as an organic solvent. In addition to Li-carbonate and Li, the coating layer may further include $(CH_2OCO_2Li)_2$, $(CH_2CH_2OCO_2Li)_2$, $LiO(CH_2)_2CO_2(CH_2)_2OCO_2Li$, or the like.

The coating layer interrupts insertion of the organic solvent into the negative electrode active material layer to inhibit decomposition of the organic solvent, thereby improving stabilization of the negative electrode active material structure and negative electrode reversibility. In other words, the reaction of forming the coating layer is a preliminary reaction of the irreversible region of the negative electrode active material. Thus, it is possible to prevent the problems of consumption of lithium ions during the subsequent battery operation and degradation of battery capacity, thereby improving cycle life.

In still another aspect of the present disclosure, there is provided a lithium secondary battery including the above-described pre-lithiated negative electrode. In other words, an electrode assembly may be formed by using a positive electrode including a positive electrode active material, a separator and the pre-lithiated negative electrode, and the electrode assembly and an electrolyte may be introduced to a battery casing to provide a lithium secondary battery.

Particular examples of the positive electrode active material may include, but are not limited to: layered compounds such as lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; lithium nickel oxides represented by the chemical formula of $LiNi_{1-y}M_yO_2$ (wherein M is Co, Mn, Al, Cu, Fe, Mg, B or Ga, and y is 0.01-0.3); ternary lithium manganese composite oxides represented by the chemical formula of $LiMn_{2-y}M_yO_2$ (wherein M is Co, Ni, Fe, Cr, Zn or Ta, and y is 0.01-0.1), or $Li_2Mn_3MO_8$ (wherein M is Fe, Co, Ni, Cu or Zn); $LiMn_2O_4$ in which Li is partially substituted with an alkaline earth metal ion; disulfide compounds; $Fe_2(MoO_4)_3$; ternary lithium transition metal composite oxides, such as $Li(Ni_aCo_bMn_c)O_2$ ($0<a<1$, $0<b<1$, $0<c<1$, $a+b+c=1$); or the like.

The positive electrode active material may be dispersed in a solvent together with a binder polymer, a conductive material and other additives to form positive electrode mixture slurry. Then, the positive electrode mixture slurry may be coated on at least one surface of a positive electrode current collector, followed by drying and pressing, to form a positive electrode.

Non-limiting examples of the positive electrode current collector include foil made of aluminum, nickel or a combination thereof, or the like, and non-limiting examples of the negative electrode current collector include foil made of copper, gold, nickel, copper alloy or a combination thereof, or the like.

The binder polymer, the conductive material and other additives may be the same as or different from those used in the negative electrode. Reference will be made to the above description about the binder polymer and the conductive material.

The separator is interposed between the positive electrode and the negative electrode, and an insulating thin film having high ion permeability and mechanical strength is used as the separator. The separator generally has a pore diameter of 0.01-10 μm and a thickness of 5-300 μm. The separator may include a porous polymer substrate, such as a porous polymer film substrate or porous polymer non-woven web substrate, alone, or may further include a porous coating layer disposed on at least one surface of the porous polymer substrate and containing inorganic particles and a binder polymer. The porous polymer film substrate may be a porous polymer film made of polyolefin, such as polyethylene or polypropylene. In addition to polyolefin, the porous polymer film substrate may be made of polyethylene terephthalate, polybutylene terephthalate, polyester, polyacetal, polyamide, polycarbonate, polyimide, polyetherether ketone, polyether sulfone, polyphenylene oxide, polyphenylene sulfide, or the like, alone or in combination.

Non-limiting examples of the binder polymer include but are not limited to: polyvinylidene fluoride, polyvinylidene fluoride-co-hexafluoropropylene, polyvinylidene fluoride-co-trichloroethylene, polymethyl methacrylate, polybutyl acrylate, polybutyl methacrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethyl polyvinylalchol, cyanoethyl cellulose, cyanoethyl sucrose, pullulan, carboxymethyl cellulose, or the like.

According to an embodiment of the present disclosure, the binder polymer may be classified into a dispersant binder polymer also functioning as a dispersant, and a non-dispersant binder polymer. The dispersant binder polymer is a polymer having at least one dispersion-contributing functional group in the backbone or sidechain of the polymer, and the dispersion-contributing functional group includes an OH group, CN group, or the like. Particular examples of the dispersant binder polymer include cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, or the like. Particular examples of the non-dispersant binder polymer include the above-listed binder polymers, except the examples of the dispersant binder polymer.

For example, the weight ratio of the inorganic particles to the total weight of the binder polymer and crosslinked polymer may be 50:50-99:1, particularly 70:30-95:5. When the weight ratio of the inorganic particles to the total weight of the binder polymer and crosslinked polymer satisfies the above-defined range, it is possible to prevent the problem of a decrease in pore size and porosity of the resultant coating layer, caused by an increase in content of the binder polymer and the crosslinked polymer. It is also possible to solve the problem of degradation of peeling resistance of the resultant coating layer, caused by a decrease in content of the binder polymer and the crosslinked polymer Non-limiting examples of the inorganic particles include inorganic particles having a dielectric constant of 5 or more, particularly 10 or more, inorganic particles having lithium ion transportability, or a mixture thereof.

Non-limiting examples of the inorganic particles having a dielectric constant of 5 or more may include $BaTiO_3$, $Pb(Zr,Ti)O_3$ (PZT), $Pb_{1-x}La_xZr_{1-y}Ti_yO_3$ (PLZT), $Pb(Mg_{1/3}Nb_{2/3})O_3PbTiO_3$ (PMN-PT), hafnia ($HfO_2$), $SrTiO_3$, $SnO_2$, $CeO_2$, $MgO$, $NiO$, $CaO$, $ZnO$, $ZrO_2$, $Y_2O_3$, $Al_2O_3$, $TiO_2$, SiC, AlO(OH), $Al_2O_3 \cdot H_2O$, or a mixture thereof.

As used herein, the term 'inorganic particles having lithium ion transportability' refers to inorganic particles which contain lithium elements and do not store lithium but transport lithium ions. Non-limiting examples of the inorganic particles having lithium ion transportability include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), (LiAl-TiP)$_xO_y$-based glass ($1<x<4$, $0<y<13$), such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), such as $Li_{3.25}Ge_{0.25}P_{0.75}S_4$, lithium nitride ($Li_xN_y$, $0<x<4$, $0<y<2$), such as $Li_3N$, $SiS_2$-based glass ($Li_xSi_yS_z$, $0<x<3$, $0<y<2$, $0<z<4$), such as $Li_3PO_4$—$Li_2S$—$SiS_2$, and $P_2S_5$-based glass ($Li_xP_yS_z$, $0<x<3$, $0<y<3$, $0<z<7$), such as $LiI$—$Li_2S$—$P_2S_5$, or a mixture thereof.

Although there is no particular limitation in the thickness of the porous coating layer, the thickness may be 1-10 μm, or 1.5-6 μm. Also, the porosity of the porous coating layer is not particularly limited, but it may be preferably 35-65%.

The electrolyte includes conventional electrolyte ingredients, such as an organic solvent and an electrolyte salt. The electrolyte salt that may be used is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof. Particularly, a lithium salt is preferred. For example, $LiClO_4$, $LiCF_3SO_3$, $LiPF_6$, $LiAsF_6$, $LiN(CF_3SO_2)_2$ or a mixture thereof may be used.

The organic solvent used for the electrolyte may include a solvent generally known to those skilled in the art, such as a cyclic carbonate solvent containing a halogen substituent or not; a linear carbonate solvent; an ester solvent, a nitrile solvent, a phosphate solvent, or a mixture thereof. Particular examples of the solvent that may be used include propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (GBL), flouoroethylene carbonate (FEC), methyl formate, ethyl formate, propyl formate, methyl acetate, ethyl acetate, propyl acetate, pentyl acetate, methyl propionate, ethyl propionate, propyl propionate, butyl propionate, or a mixture thereof.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

There is no particular limitation in the appearance or casing of the lithium secondary battery according to an embodiment of the present disclosure. For example, the lithium secondary battery may have a cylindrical shape using a can, a prismatic shape, a pouch-like shape or a coin-like shape.

In addition, the lithium secondary battery according to an embodiment of the present disclosure may include any conventional lithium secondary batteries, such as lithium metal secondary batteries, lithium ion secondary batteries, lithium polymer secondary batteries or lithium ion polymer secondary batteries.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

<Manufacture of Negative Electrode>

First, 92 parts by weight of artificial graphite as a negative electrode active material, 3 parts by weight of Denka black as a conductive material, 3.5 parts by weight of styrene butadiene rubber (SBR) as a binder and 1.5 parts by weight of carboxymethyl cellulose as a binder and thickener were added to water as a dispersion medium to prepare negative electrode slurry.

The negative electrode slurry was coated on one surface of a copper current collector having a thickness of 20 μm and dried at a temperature of 60° C. Then, the negative electrode mixture layer was pressed by using a roll press device to a porosity of 25% so that it might satisfy the target thickness. After that, the resultant structure was dried in a vacuum oven at 130° C. for 8 hours to obtain a negative electrode.

<Pre-Lithiation Based on Electrochemical Charging Under Pressurization Using Silicone Pads>

The negative electrode obtained as described above was cut by using a cutter capable of cutting the negative electrode in such a manner that the negative electrode active material-retaining portion alone, except the non-coated tab portion, might have a dimension of 34 mm×50 mm. Next, the negative electrodes, lithium ion-supplying sheets and separators were stacked in such a manner that the separators were interposed between six negative electrodes and seven lithium metal/SUS plates, and then also disposed at both outermost sides. The resultant stack was introduced to a pouch to prepare a simple cell for pre-lithiation. Herein, the lithium metal/SUS plate used as a lithium ion-supplying metal sheet includes a SUS plate attached to one surface of lithium metal.

The prepared simple cell was wetted with an electrolyte for pre-lithiation, including 1 M LiPF$_6$ dissolved in a solvent containing ethylene carbonate (EC) and ethyl methyl carbonate (EMC) mixed at a volume ratio of 3:7, and 2 wt % of fluoroethylene carbonate (FEC) added thereto, at 25° C. for 3 hours.

Figure 1:
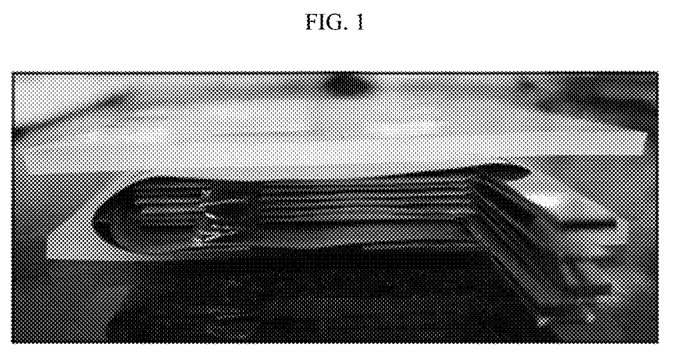
FIG. 1 is a photographic view illustrating the simple cell for pre-lithiation used in the method for pre-lithiation of a negative electrode according to Example 1.

Then, as polymer pads, two silicone (polysiloxane) pads having a thickness of 5 mm were disposed at the upper side and the lower side of the simple cell immersed in the electrolyte for pre-lithiation (see, FIG. 1).

Figure 2:
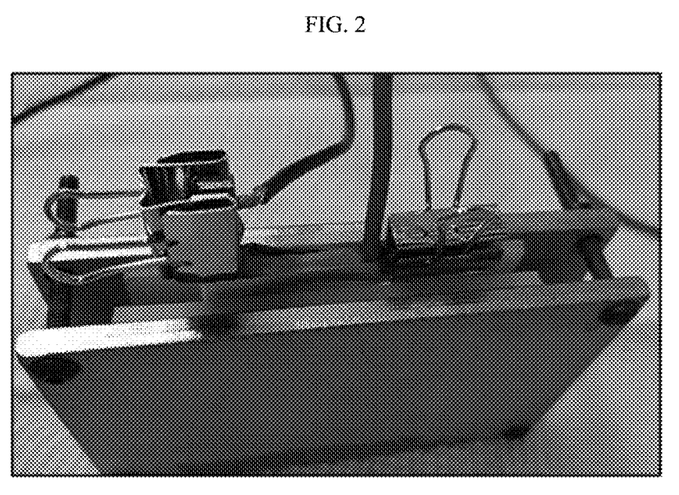
FIG. 2 is a photographic view illustrating the pre-lithiation of a negative electrode through the electrochemical charge of a simple cell for pre-lithiation with a charger in the method for pre-lithiation of a negative electrode according to Example 1.

After that, the simple cell disposed between the two silicone pads were interposed between a pair of jigs of a jig press, and then subjected to electrochemical charging by using a charger to carry out pre-lithiation of the negative electrode of the simple cell (see, FIG. 2).

The silicone pads had a thickness of 85% of the thickness of the jig of the jig press. The area of one surface of the silicone pad facing the simple cell was larger than the area of the lithium metal/SUS plate, and the simple cell were pressurized, after it was controlled to be disposed precisely in the silicone pads in such a manner that four edges of the lithium metal/SUS plate might be totally in contact with one surface of the polymer pad. Particularly, the simple cell was controlled to be disposed precisely at a point inside of the end of the silicone pad with an interval of about 3 mm, and pressurized under a pressure of 2 kPa.

Herein, the electric current was set to an extent of 1 mA/cm$^2$ and the simple cell was charged electrochemically to 25% of the negative electrode charge capacity (based on Li-ion charge capacity). After completing the pre-lithiation, the negative electrode was washed with ethyl methyl carbonate (EMC) and dried at room temperature, thereby providing a pre-lithiated negative electrode.

<Manufacture of Lithium Secondary Battery>

The pre-lithiated negative electrode obtained as described above was used as a negative electrode. The negative electrode was stacked with LiNi$_{0.8}$Co$_{0.1}$Mn$_{0.1}$O$_2$ as a positive electrode with a separator (made of polypropylene, available from W-scop Co., WL20C, thickness 10 μm) interposed therebetween, and then an electrolyte prepared by adding 2 wt % of fluoroethylene carbonate (FEC) to a solvent including ethylene carbonate (EC) and ethyl methyl carbonate (EMC) mixed at a volume ratio of 3:7 and dissolving 1 M LiPF$_6$ therein was injected thereto, thereby providing a coin-type half-cell as a lithium secondary battery.

Example 2

A pre-lithiated negative electrode and a coin-type half-cell as a lithium secondary battery including the same were obtained in the same manner as Example 1, except that the silicone pads had a thickness of 70% of the thickness of the jig of the jig press.

Comparative Example 1

<Manufacture of Negative Electrode>

A negative electrode was obtained in the same manner as Example 1.

<Pre-lithiation Based on Electrochemical Charging>

The negative electrode obtained as described above was cut by using a cutter capable of cutting the negative electrode in such a manner that the negative electrode active material-retaining portion alone, except the non-coated tab portion, might have a dimension of 34 mm×50 mm. Next, the negative electrode was wetted with an electrolyte for pre-lithiation, including 1 M $LiPF_6$ dissolved in a solvent containing ethylene carbonate (EC) and ethyl methyl carbonate (EMC) mixed at a volume ratio of 3:7, and 2 wt % of fluoroethylene carbonate (FEC) added thereto, at 25° C. for 3 hours. Then, lithium metal was used as a counter electrode and disposed on both surfaces of the negative electrode in the presence of the electrolyte, and electrochemical charging was carried out to perform pre-lithiation of the negative electrode. Herein, no separator was present between the negative electrode and lithium metal, and the negative electrode and lithium metal were spaced apart from each other by an interval of 3 cm. The negative electrode was pre-lithiated by carrying out electrochemical charging under a pressure of 2 kPa with a jig press in the absence of a silicone pad. Herein, the electric current was set to an extent of 2 mA/cm² and the negative electrode was charged electrochemically to 25% of the negative electrode charge capacity (based on Li-ion charge capacity). After completing the pre-lithiation, the negative electrode was washed with ethyl methyl carbonate (EMC) and dried at room temperature, thereby providing a pre-lithiated negative electrode.

<Manufacture of Lithium Secondary Battery>

The pre-lithiated negative electrode obtained as described above was used as a negative electrode. The negative electrode was stacked with $LiNi_{0.8}Co_{0.1}Mn_{0.1}O_2$ as a positive electrode with a separator (made of polypropylene, available from W-scop Co., WL20C, thickness 10 µm) interposed therebetween, and then an electrolyte prepared by adding 2 wt % of fluoroethylene carbonate (FEC) to a solvent including ethylene carbonate (EC) and ethyl methyl carbonate (EMC) mixed at a volume ratio of 3:7 and dissolving 1 M $LiPF_6$ therein, was injected thereto, thereby providing a coin-type half-cell as a lithium secondary battery.

Comparative Example 2

A pre-lithiated negative electrode and a coin-type half-cell as a lithium secondary battery including the same were obtained in the same manner as Example 1, except that the silicone pads had a thickness of 35% corresponding to the thickness of the jig of the jig press.

Comparative Example 3

A pre-lithiated negative electrode and a coin-type half-cell as a lithium secondary battery including the same were obtained in the same manner as Example 1, except that the silicone pads had a thickness of 120% corresponding to the thickness of the jig of the jig press.

<Cycle Charge/Discharge Test>

Figure 3:
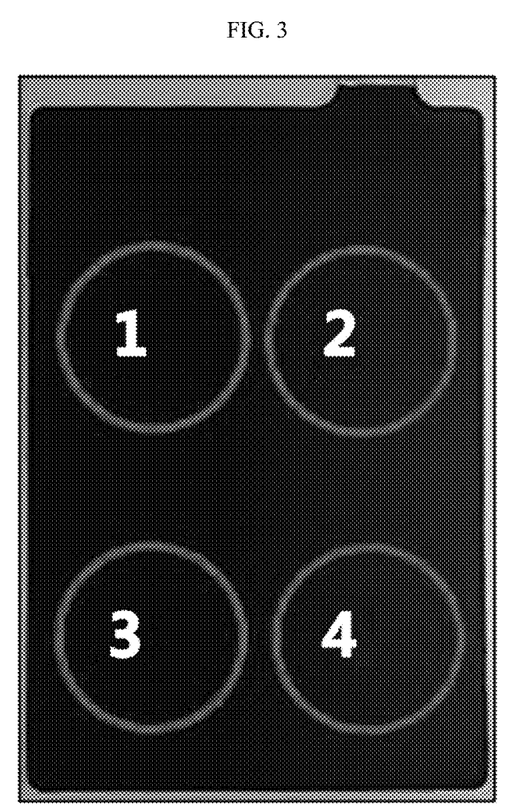
FIG. 3 is a photographic view illustrating how the negative electrode used for a cycle charge/discharge test of each of the lithium secondary batteries according to Examples 1 and 2 and Comparative Examples 1-3 is manufactured through cutting at positions 1-4 in the pre-lithiated negative electrode.

In each of the coin-type half-cells according to Examples 1 and 2 and Comparative Examples 1-3, four negative electrodes were cut from one sheet of the negative electrode from position 1 to position 4, as shown in FIG. 3, and a charge/discharge reversibility test was carried out by using an electrochemical charger. Each negative electrode was charged to 4.2 V (vs. Li/Li⁺) at a current density of 0.1 C rate, and discharged to 2.5 V at the same current density. Then, the initial coulombic efficiency (%) was calculated for position 1 to position 4 according to the following formula, and the average value is shown in the following Table 1 and FIG. 4.

Initial coulombic efficiency (%)=[(Discharge capacity at the first cycle)/(Charge capacity at the first cycle)]×100

TABLE 1

| Position | | Ex. 1 | Ex. 2 | Comp. Ex. 1 | Comp. Ex. 2 | Comp. Ex. 3 |
|---|---|---|---|---|---|---|
| 1 | Initial coulombic efficiency (%) | 92.4 | 90.1 | 78.2 | 87.7 | 82.2 |
| 2 | Initial coulombic efficiency (%) | 92.2 | 90.0 | 79.3 | 87.6 | 83.3 |
| 3 | Initial coulombic efficiency (%) | 92.5 | 90.4 | 80.1 | 87.3 | 83.0 |
| 4 | Initial coulombic efficiency (%) | 92.6 | 90.2 | 78.0 | 86.9 | 83.6 |
| Average | Initial coulombic efficiency (%) | 92.425 | 90.175 | 78.9 | 87.375 | 83.025 |

Figure 4:
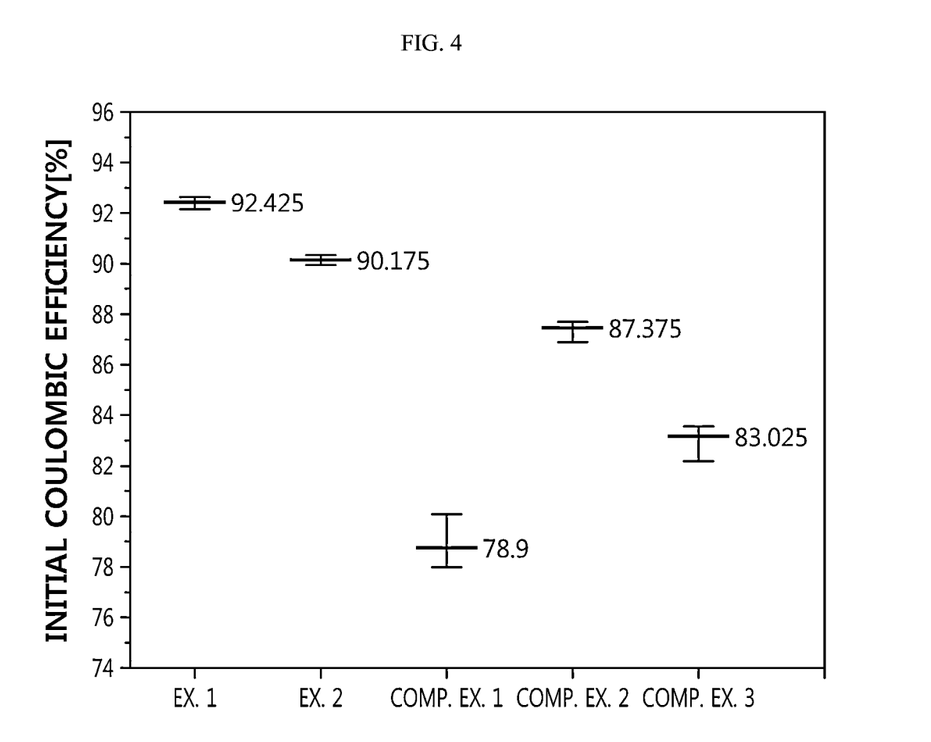
FIG. 4 is a graph illustrating the cycle charge/discharge test results of the lithium secondary batteries according to Examples 1 and 2 and Comparative Examples 1-3.

Referring to Table 1 and FIG. 4, in the case of Examples 1 and 2, pre-lithiation is carried out through electrochemical charging under pressurization using silicone pads having an adequate range of thickness, and thus lithium ions are intercalated to the negative electrode sufficiently homogeneously and a uniform SEI layer is formed. As a result, the secondary battery using the pre-lithiated negative electrode shows improved charge/discharge performance, and the difference between the maximum initial coulombic efficiency and the minimum initial coulombic efficiency is 0.4%, which suggests that lithium ions are intercalated significantly homogeneously. On the contrary, in the case of Comparative Examples 1 and 2, no silicone pad is used or silicone pads having an excessively small thickness are used during the pre-lithiation, and thus active materials cannot be in contact with one another homogeneously to cause an increase in resistance during charge/discharge, resulting in degradation of cycle performance and a large deviation in the initial coulombic efficiency. In addition, when silicone pads having an excessively large thickness are used during the pre-lithiation in the case of Comparative Example 3, the pressure cannot be applied uniformly during the pressurization with a jig press, and lithium ions are intercalated partially to the negative electrode to cause lithium plating, resulting in degradation of the cycle performance of the secondary battery using the pre-lithiated negative electrode.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A method for pre-lithiation of a negative electrode comprising:
    interposing a separator between a lithium ion-supplying metal sheet and a negative electrode to prepare a simple cell;
    immersing the simple cell in an electrolyte for pre-lithiation; and
    disposing the simple cell immersed in the electrolyte for pre-lithiation between two polymer pads, and carrying out electrochemical charging, while pressurizing the outside of the two polymer pads by using a pressurizing member provided with a pair of jigs, to perform pre-lithiation of the negative electrode,
    wherein each of the polymer pads has a thickness of 60% to 90% of a thickness of a corresponding jig of the pair of jigs,
    wherein the pressurizing is conducted under a pressure of 0.01-10 kPa.

2. The method for pre-lithiation of the negative electrode according to claim 1, wherein each of the polymer pads has a thickness of 70% to 85% of a thickness of a corresponding jig of the pair of jigs.

3. The method for pre-lithiation of the negative electrode according to claim 1, wherein the pressurizing member comprises a jig press or a jig formation device.

4. The method for pre-lithiation of the negative electrode according to claim 1, wherein one surface of each of the polymer pads facing the simple cell has an area larger than an area of the lithium ion-supplying metal sheet, and an entirety of four edges of the lithium ion-supplying metal sheet are in contact with the surfaces of the polymer pads.

5. The method for pre-lithiation of the negative electrode according to claim 1, wherein each of the polymer pads comprises a polymer having a glass transition temperature of −100° C. or lower.

6. The method for pre-lithiation of the negative electrode according to claim 5, wherein the polymer comprises at least one of silicone, polybutadiene, or low-density polyethylene.

7. The method for pre-lithiation of the negative electrode according to claim 1, wherein the electrolyte for pre-lithiation comprises a lithium salt and a non-aqueous solvent.

8. The method for pre-lithiation of the negative electrode according to claim 7, wherein the lithium salt comprises at least one of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lithium lower aliphatic carboxylate, or lithium 4-phenylborate.

9. The method for pre-lithiation of the negative electrode according to claim 1, wherein the electrochemical charging is carried out to 1% to 50% of a charge capacity of the negative electrode based on Li-ion charge capacity.

10. A pre-lithiated negative electrode obtained by the method as defined in claim 1.

11. A lithium secondary battery comprising the pre-lithiated negative electrode as defined in claim 10.

* * * * *